(12) United States Patent
Moore et al.

(10) Patent No.: US 9,110,510 B2
(45) Date of Patent: Aug. 18, 2015

(54) MOTION PATTERN CLASSIFICATION AND GESTURE RECOGNITION

(75) Inventors: Christopher Moore, San Francisco, CA (US); Xiaoyuan Tu, Sunnyvale, CA (US); William Matthew Vieta, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1111 days.

(21) Appl. No.: 13/153,374

(22) Filed: Jun. 3, 2011

(65) Prior Publication Data

US 2012/0306745 A1 Dec. 6, 2012

(51) Int. Cl.
G09G 5/00 (2006.01)
G06F 3/01 (2006.01)
G06K 9/00 (2006.01)

(52) U.S. Cl.
CPC ............ *G06F 3/017* (2013.01); *G06K 9/00355* (2013.01)

(58) Field of Classification Search
CPC ... G06F 1/1613; G06F 1/1686; G06F 1/1694; G06F 3/017; G06F 3/0236; G06F 2200/1637; G06F 3/0346; G06F 3/038; G06F 2203/0384; A63F 13/06; A63F 13/10; A63F 2300/1043; A63F 2300/105; A63F 2300/6027; A63F 2300/6045
USPC .......... 345/156–184; 178/18.01–18.09, 18.11
See application file for complete search history.

(56) References Cited

U.S. PATENT DOCUMENTS

| | | |
|---|---|---|
| 5,598,187 A | 1/1997 | Ide et al. |
| 6,701,292 B1 | 3/2004 | Kawai et al. |
| 2007/0094061 A1 | 4/2007 | Hu et al. |
| 2009/0051648 A1 | 2/2009 | Shamaie et al. |
| 2009/0088204 A1 | 4/2009 | Culbert et al. |
| 2009/0221937 A1* | 9/2009 | Smith et al. ................... 600/595 |
| 2009/0265671 A1 | 10/2009 | Sachs et al. |
| 2010/0033422 A1* | 2/2010 | Mucignat et al. ............ 345/156 |
| 2010/0069123 A1 | 3/2010 | Araradian et al. |
| 2010/0304754 A1 | 12/2010 | Czompo et al. |
| 2011/0044501 A1 | 2/2011 | Tu et al. |
| 2011/0055212 A1 | 3/2011 | Tsai et al. |
| 2011/0109548 A1 | 5/2011 | Tu et al. |

FOREIGN PATENT DOCUMENTS

FR 2950713 1/2011

OTHER PUBLICATIONS

Communication Relating to the Results of the Partial International Search, Sep. 19, 2012, International Application No. PCT/US2012/037999, 8 pp.
International Search Report and Written Opinion for International Application No. PCT/US/2012/037999, filed May 15, 2012. Received Dec, 7, 2012. 29 pages.

* cited by examiner

*Primary Examiner* — Kent Chang
*Assistant Examiner* — Nelson Rosario
(74) *Attorney, Agent, or Firm* — Fish & Richardson P.C.

(57) ABSTRACT

Methods, program products, and systems for gesture classification and recognition are disclosed. In general, in one aspect, a system can determine multiple motion patterns for a same user action (e.g., picking up a mobile device from a table) from empirical training data. The system can collect the training data from one or more mobile devices. The training data can include multiple series of motion sensor readings for a specified gesture. Each series of motion sensor readings can correspond to a particular way a user performs the gesture. Using clustering techniques, the system can extract one or more motion patterns from the training data. The system can send the motion patterns to mobile devices as prototypes for gesture recognition.

36 Claims, 12 Drawing Sheets

MOTION PATTERN CLASSIFICATION AND GESTURE RECOGNITION

TECHNICAL FIELD

This disclosure relates generally to motion-based operations of a mobile device.

BACKGROUND

A mobile device can include a motion sensor that is configured to detect a motion of the mobile device. The motion sensor can measure movement and rotation of the mobile device in a two-dimensional or three-dimensional space and provide as an output a series of readings of the acceleration. Based on the motion sensor readings, the mobile device can determine whether the device is or was in motion. The mobile device can use the motion to control various functions or application programs of the mobile device. For example, the mobile device can use the series of readings as an input to an application program. Based on the motion sensor readings, the application program can perform various tasks.

SUMMARY

Methods, program products, and systems for motion pattern classification and gesture recognition are disclosed. In general, in a motion pattern classification aspect, a system can determine multiple motion patterns for a same gesture (e.g., picking up a mobile device from table). The motion patterns can be determined from empirical training data. The system can collect the training data from one or more mobile devices. The system can request a user to perform the gesture on each mobile device. The system then obtains from the mobile devices, as training data, multiple series of motion sensor readings for the gesture. Each series of motion sensor readings can correspond to a particular way a user moves to perform the gesture. Using clustering techniques, the system can extract one or more motion patterns from the training data. The system can send the motion patterns to mobile devices as prototypes for recognizing the gesture.

In general, in a gesture recognition aspect, a mobile device can use the motion patterns received from the system as prototypes to recognize multiple ways of making a gesture. When the mobile device detects a motion using a motion sensor, the mobile device can compare readings of the motion sensor to each of the prototypes to identify a match. Once a match is identified, the mobile device can recognize the gesture. The mobile device can perform one or more specified tasks based on the recognized gesture.

Motion pattern classification and gesture recognition can be implemented to achieve the following advantages. Multiple ways of a same gesture can be recognized. For example, a mobile device can recognize a same gesture of picking up the mobile device without regard to whether the device was picked up by a left hand, by a right hand, in a slow motion, in a fast motion, from a pocket, or from a table. The mobile device can recognize a user's gesture without requiring the user to practice the gesture. The mobile device can recognize a user's gesture regardless of the user's specific habit of gesturing the mobile devices. Complex and customized gestures can be recognized. For example, a mobile device can designate a specific gesture as a signature. Subsequently, the mobile device can use the signature to authenticate a user by recognizing the user's gesture in place of or in addition to a user name or a password or both.

The details of one or more implementations of motion pattern classification and gesture recognition are set forth in the accompanying drawings and the description below. Other features, aspects, and advantages of motion pattern classification and gesture recognition will become apparent from the description, the drawings, and the claims.

BRIEF DESCRIPTION OF THE DRAWINGS

Like reference symbols in the various drawings indicate like elements.

DETAILED DESCRIPTION

Overview of Motion Pattern Classification and Gesture Recognition

Figure 1:
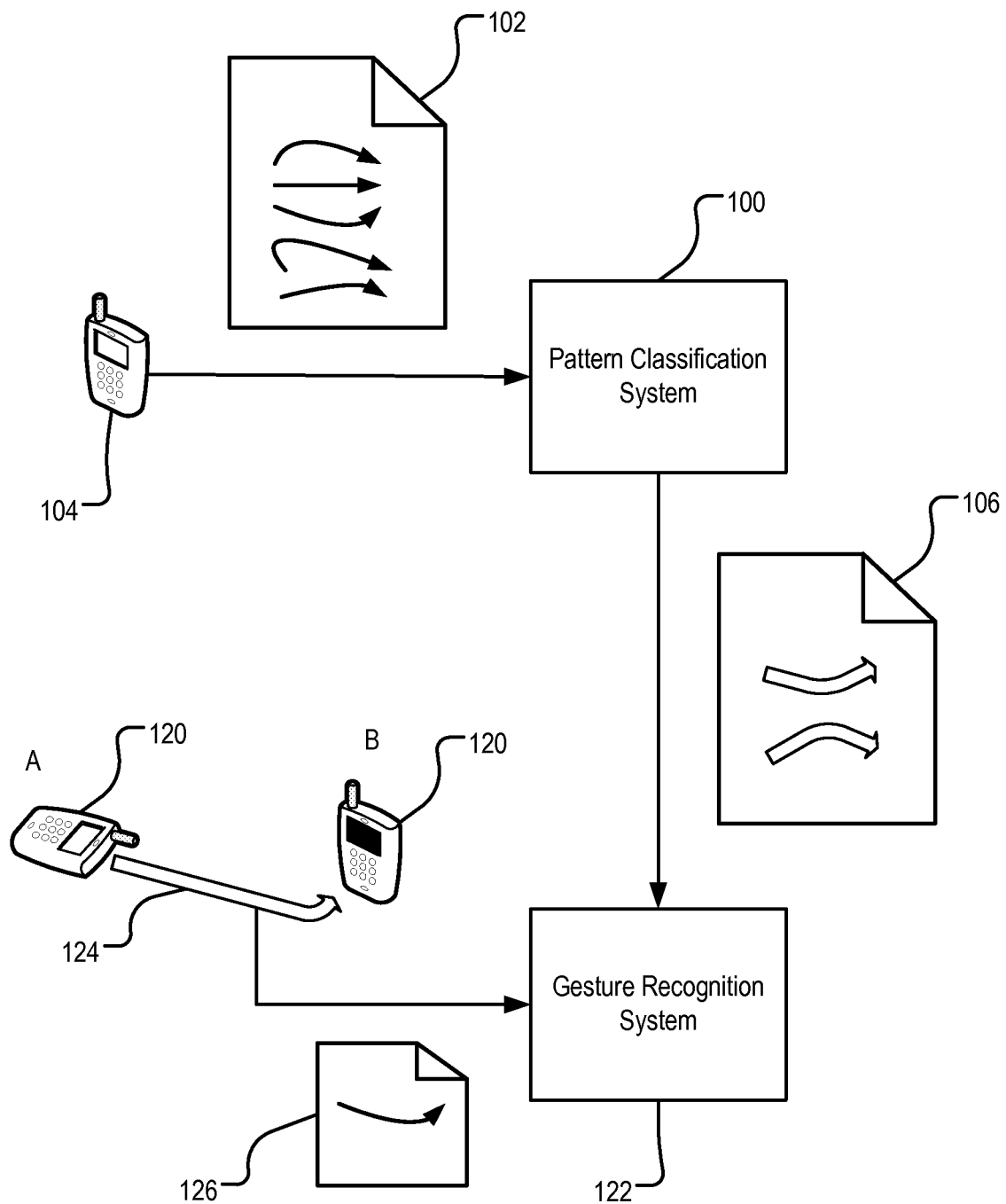
FIG. 1 is a diagram that provides an overview of motion pattern classification and gesture recognition.

FIG. 1 is a diagram that provides an overview of motion pattern classification and gesture recognition. Motion pattern classification system 100 is a system including one or more computers programmed to generate one or more motion patterns from empirical data. Motion pattern classification system 100 can receive motion samples 102 as training data from at least one mobile device 104. Each of the motion samples 102 can include a time series of readings of a motion sensor of mobile device 104.

Motion pattern classification system 100 can process the received motion samples 102 and generate one or more motion patterns 106. Each of the motion patterns 106 can include a series of motion vectors. Each motion vector can include linear acceleration values, angular rate values, or both, on three axes of a Cartesian coordinate frame (e.g., X, Y, Z or pitch, yaw, roll). Each motion vector can be associated with a timestamp. Each motion pattern 106 can serve as a prototype to which motions are compared such that a gesture can be recognized. Motion pattern classification system 100 can send motion patterns 106 to mobile device 120 for gesture recognition.

Mobile device 120 can include, or be coupled to, gesture recognition system 122. Gesture recognition system 122 is a component of mobile device 120 that includes hardware, software, or both that are configured to identify a gesture based on motion patterns 106. Mobile device 120 can move (e.g., from a location A to a location B) and change orientations (e.g., from a face-up orientation on a table to an upright orientation near a face) following motion path 124. When mobile device 120 moves, a motion sensor of mobile device 120 can provide a series of sensor readings 126 (e.g., acceleration readings or angular rate readings). Gesture recognition system 122 can receive sensor readings 126 and filter sensor readings 126. Gesture recognition system 122 can compare the filtered sensor readings 126 with the motion patterns 106. If a match is found, mobile device 120 can determine that a gesture is recognized. Based on the recognized gesture, mobile device can perform a task associated with the motion patterns 106 (e.g., turning off a display screen of mobile device 120).

Exemplary Gesture Classification

Figure 2:
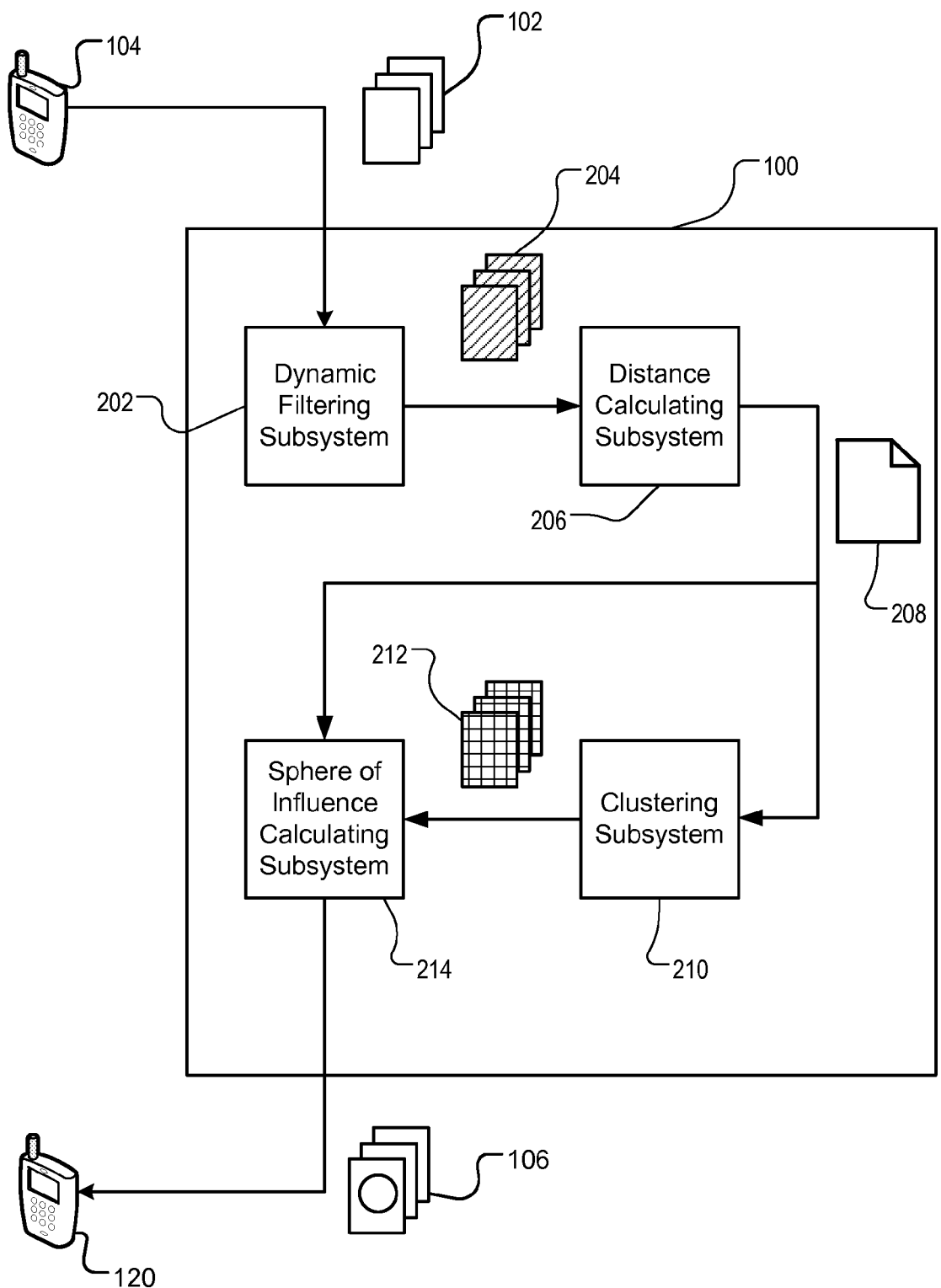
FIG. 2 is a block diagram of an exemplary system configured to perform operations of motion pattern classification.

FIG. 2 is a block diagram of an exemplary system configured to perform operations of motion pattern classification. Motion pattern classification system 100 can receive motion samples 102 from mobile device 104, generates prototype motion patterns 106 based on motion samples 102, and send prototype motion patterns 106 to mobile device 120.

Mobile device 104 is a mobile device configured to gather motion samples 102. An application program executing on mobile device 104 can provide for display a user interface requesting a user to perform a specified physical gesture with mobile device 104 one or more times. The specified gesture can be, for example, a gesture of picking up mobile device 104 from a table or a pocket and putting mobile device 104 near a human face. The gesture can be performed in various ways (e.g., left-handed or right-handed). The user interface is configured to prompt the user to label a movement each time the user completes the movement. The label can be positive, indicating the user acknowledges that the just-completed movement is a way of performing the gesture. The label can be negative, indicating that the user specifies that the just-completed movement is not a way of performing the gesture. Mobile device 104 can record a series of motion sensor readings during the movement. Mobile device 104 can designate the recorded series of motion sensor readings, including those labeled as positive or negative, as motion samples 102. The portions of motion samples 102 that are labeled negative can be used as controls for tuning the motion patterns 106. Motion samples 102 can include multiple files, each file corresponding to a motion example and a series of motion sensor readings. Content of each file can include triplets of motion sensor readings (3 axes of sensed acceleration), each triplet being associated with a timestamp and a label. The label can include a text string or a value that designates the motion sample as a positive sample or a negative sample.

Motion pattern classification system 100 can include dynamic filtering subsystem 202. Dynamic filtering subsystem 202 is a component of motion pattern classification system 100 that is configured to generate normalized motion samples (also referred to as motion features) 204 based on motion samples 102. Dynamic filtering subsystem 202 can high-pass filter each of motion samples 102. High-pass filtering of motion samples 102 can include reducing a dimensionality of the motion example and compressing the motion sample in time such that each of motion samples 102 has a similar length in time. Further details of the operations of dynamic filtering subsystem 202 will be described below in reference to FIG. 3.

Motion pattern classification system 100 can include distance calculating subsystem 206. Distance calculating subsystem 206 is a component of motion pattern classification system 100 that is configured to calculate a distance between each pair of motion features 204. Distance calculating subsystem 206 can generate a D-path matrix 208 of distances. The distance between a pair of motion features 204 can be a value that indicates a similarity between two motion features. Further details of the operations of calculating a distance between a pair of motion features 204 and of the D-path matrix 208 will be described below in reference to FIG. 4.

Motion pattern classification system 100 can include clustering subsystem 210. Clustering subsystem 210 is a component of motion pattern classification system 100 that is configured to generate one or more raw motion patterns 212 based on the D-path matrix 208 from the distance calculating system 206. Each of the raw motion patterns 212 can include a time series of motion vectors. The time series of motion vectors can represent a cluster of motion features 204. The cluster can include one or more motion features 204 that clustering subsystem 210 determines to be sufficiently similar such that they can be treated as a class of motions. Further details of operations of clustering subsystem 210 will be described below in reference to FIG. 5.

Motion pattern classification system 100 can include sphere-of-influence (SOI) calculating subsystem 214. SOI calculating subsystem 214 is a component of the motion pattern classification system 100 configured to generate one or more motion patterns 106 based on the raw motion patterns 212 and the D-path matrix 208. Each of the motion patterns 106 can include a raw motion pattern 212 associated with an SOI. The SOI of a motion pattern is a value or a series of values that can indicate a tolerance or error margin of the motion pattern. A gesture recognition system can determine that a series of motion sensor readings match a motion pattern if the gesture recognition system determines that a distance between the series of motion sensor readings and the motion pattern is smaller than the SOI of the motion pattern. Further details of the operations of SOI calculating subsystem 214 will be described below in reference to FIGS. 6A-6C. The motion pattern classification system 100 can send the motion patterns 106 to mobile device 120 to be used by mobile device 120 to perform pattern-based gesture recognition.

Figure 3:
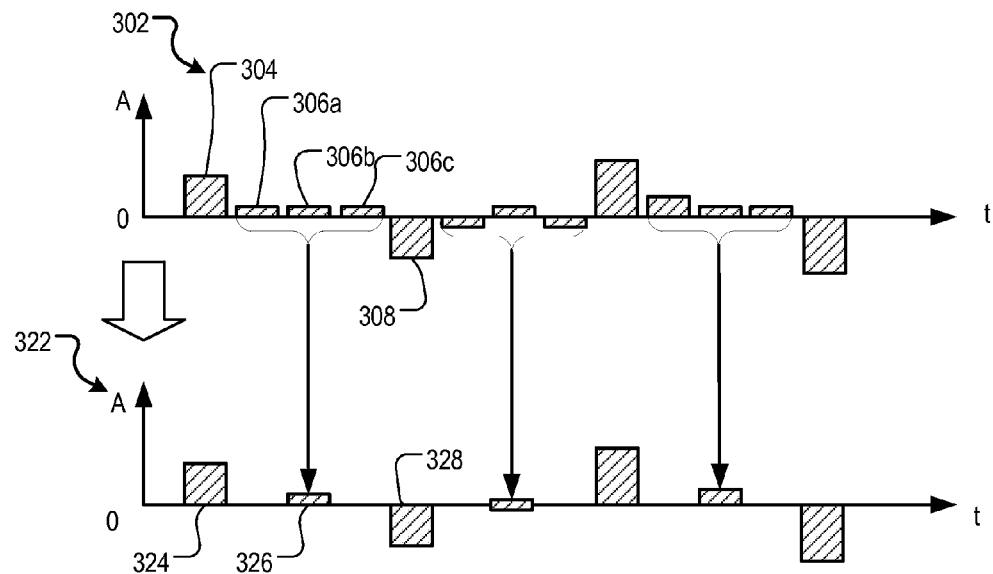
FIG. 3 is a diagram illustrating exemplary operations of dynamic filtering of motion example data.

FIG. 3 is a diagram illustrating exemplary operations of dynamic filtering motion sample data. Motion example 302 can be one of the motion samples 102 (as described above in reference to FIGS. 1-2). Motion sample 302 can include a time series of motion sensor readings 304, 306*a-c*, 308, etc. Each motion sensor reading is shown in one dimension ("A") for simplicity. Each motion sensor reading can include three acceleration values, one on each axis in a three dimensional space.

Dynamic filtering subsystem 202 (as described in reference to FIG. 2) can receive motion sample 302 and generate motion feature 322. Motion feature 322 can be one of the motion features 204. Motion feature 322 can include one or more motion vectors 324, 326, 328, etc. To generate the motion feature 322, dynamic filtering subsystem 202 can reduce the motion sample 302 in the time dimension. In some implementations, dynamic filtering subsystem 202 can apply a filtering threshold to motion sample 302. The filtering threshold can be a specified acceleration value. If a motion sensor reading 308 exceeds the filtering threshold on at least one axis (e.g., axis X), dynamic filtering subsystem 202 can process a series of one or more motion sensor readings 306a-c that precede the motion sensor reading 308 in time. Processing the motion sensor readings 306a-c can include generating motion vector 326 for replacing motion sensor readings 306a-c. Dynamic filtering subsystem 202 can generate motion vector 326 by calculating an average of motion sensor readings 306a-c. In a three-dimensional space, motion vector 326 can include an average value on each of multiple axes. Thus, dynamic filtering subsystem 202 can create motion feature 322 that has fewer data points in the time series.

In some implementations, dynamic filtering subsystem 202 can remove the timestamps of the motion samples such that motion feature 322 includes an ordered series of motion vectors. The order of the series can implicitly indicate a time sequence. Dynamic filtering subsystem 202 can preserve the labels associated with motion sample 302. Accordingly, each motion vector in motion feature 322 can be associated with a label.

Figure 4:
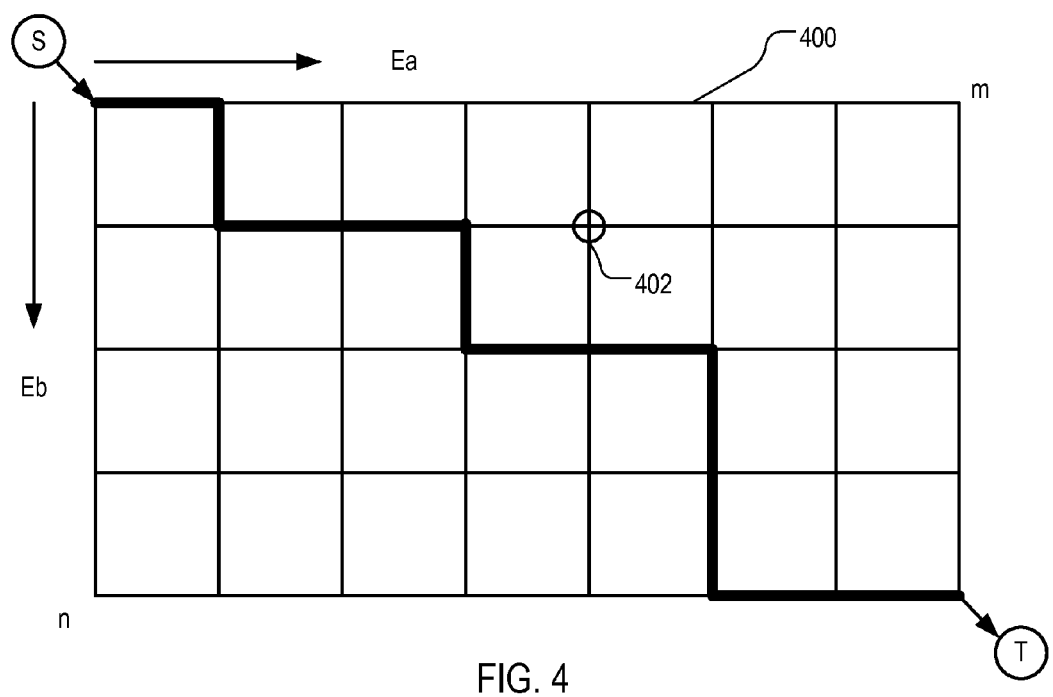
FIG. 4 is a diagram illustrating exemplary dynamic time warp techniques used in distance calculating operations of motion pattern classification.

FIG. 4 is a diagram illustrating exemplary dynamic time warp techniques used in distance calculating operations of motion pattern classification. Distance calculating subsystem 206 (as described in reference to FIG. 2) can apply dynamic time warp techniques to calculate a distance between a first motion feature (e.g., Ea) and a second motion feature (e.g., Eb). The distance between Ea and Eb will be designated as D(Ea, Eb).

In the example shown, Ea includes a time series of m accelerometer readings r(a, 1) through r(a, m). Eb includes a time series of n accelerometer readings r(b, 1) through r(b, n). In some implementations, the distance calculating subsystem 206 calculates the distance D(Ea, Eb) by employing a directed graph 400. Directed graph 400 can include m×n nodes. Each node can be associated with a cost. The cost of a node (i, j) can be determined based on a distance between accelerometer readings r(a, i) and r(b, j). For example, node 402 can be associated with a distance between accelerometer readings r(a, 5) of Ea and accelerometer readings r(b, 2) of Eb. The distance can be a Euclidean distance, a Manhattan distance, or any other distance between two values in an n-dimensional space (e.g., a three-dimensional space).

Distance calculating subsystem 206 can add a directed edge from a node (i, j) to a node (i, j+1) and from the node (i, j) to a node (i+1, j). The directed edges thus can form a grid, in which, in this example, multiple paths can lead from the node (1, 1) to the node (m, n).

Distance calculating subsystem 206 can add, to directed graph 400, a source node S and a directed edge from S to node (1, 1), and target node T and a directed edge from node (m, n) to T. Distance calculating subsystem 206 can determine a shortest path (e.g., the path marked in bold lines) between S and T, and designate the cost of the shortest path as the distance between motion features Ea and Eb.

When distance calculating subsystem 206 receives y of motion features E1 ... Ey, distance calculating subsystem 206 can create a y-by-y matrix, an element of which is a distance between two motion features. For example, element (a, b) of the y-by-y matrix is the distance D(Ea, Eb) between motion features Ea and Eb. Distance calculating subsystem 206 can designate the y-by-y matrix as D-path matrix 208 as described above in reference to FIG. 2.

Figure 5:
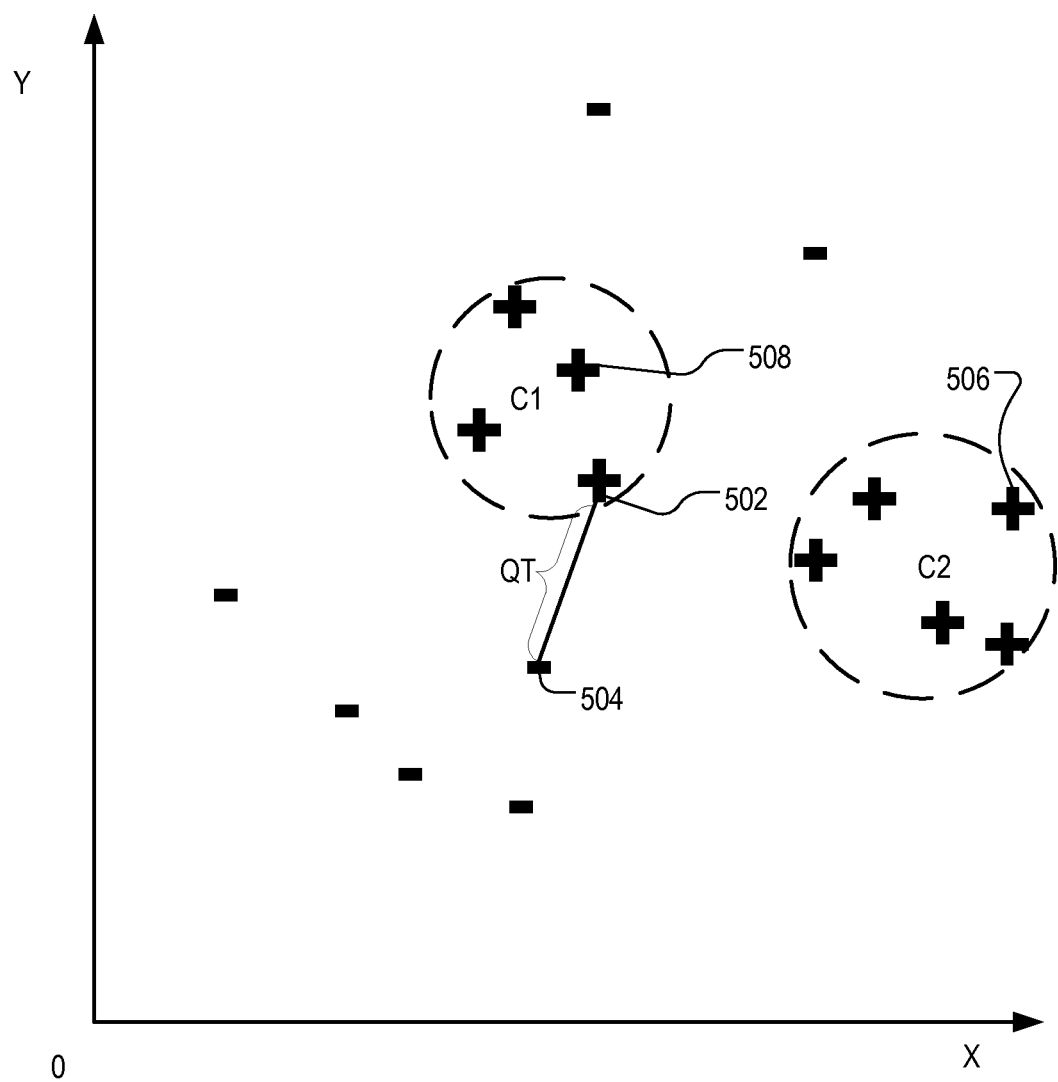
FIG. 5 is a diagram illustrating exemplary clustering techniques of motion pattern classification.

FIG. 5 is a diagram illustrating exemplary clustering techniques of motion pattern classification. The diagram is shown in a two-dimensional space for illustrative purposes. In some implementations, the clustering techniques are performed in a three-dimensional space. Clustering subsystem 206 (as described in reference to FIG. 2) can apply quality threshold techniques to create exemplary clusters of motions C1 and C2.

Clustering subsystem 206 can analyze D-path matrix 208 as described above in references to FIG. 2 and FIG. 4 and the motion features 204 as described above in reference to FIG. 2. Clustering subsystem 206 can identify a first class of motion features 204 having a first label (e.g., those labeled as "positive") and a second class of motion features 204 having a second label (e.g., those labeled as "negative"). From D-path matrix 208, clustering subsystem 206 can identify a specified distance (e.g., a minimum distance) between a first class motion feature (e.g., "positive" motion feature 502) and a second class motion feature (e.g., "negative" motion feature 504). The system can designate this distance as $Dmin(E_{L1}, E_{L2})$, where L1 is a first label, and L2 is a second label. The specified distance can include the minimum distance adjusted by a factor (e.g., a multiplier k) for controlling the size of each cluster. Clustering subsystem 206 can designate the specified distance (e.g., $kDmin(E_{L1}, E_{L2})$) as a quality threshold.

Clustering subsystem 206 can select a first class motion feature E1 (e.g., "positive" motion feature 502) to add to a first cluster C1. Clustering subsystem 206 can then identify a second first class motion feature E2 whose distance to E1 is less than the quality threshold, and add E2 to the first cluster C1. Clustering subsystem 206 can iteratively add first class motion features to the first cluster C1 until all first class motion features whose distances to E1 are each less than the quality threshold has been added to the first cluster C1.

Clustering subsystem 206 can remove the first class motion features in C1 from further clustering operations and select another first class motion feature E2 (e.g., "positive" motion feature 506) to add to a second cluster C2. Clustering subsystem 206 can iteratively add first class motion features to the second cluster C2 until all first class motion features whose distances to E2 are each less than the quality threshold have been added to the second cluster C2. Clustering subsystem 206 can repeat the operations to create clusters C3, C4, and so on until all first class motion features are clustered.

Clustering subsystem 206 can generate a representative series of motion vectors for each cluster. In some implementations, clustering subsystem 206 can designate as the representative series of motion vectors a motion feature (e.g., motion feature 508) that is closest to other motion samples in a cluster (e.g., cluster C1). Clustering subsystem 206 can designate the representative series of motion vectors as a raw motion pattern (e.g., one of raw motion patterns 212 as described above in reference to FIG. 2). To identify an example that is closest to other samples, clustering subsystem 206 can calculate distances between pairs of motion features in cluster C1, and determine a reference distance for each motion sample. The reference distance for a motion sample can be maximum distance between the motion sample and another motion sample in the cluster. Clustering subsystem 206 can identify motion feature 508 in cluster C1 that has the minimum reference distance and designate motion feature 508 as the motion pattern for cluster C1.

Figure 6A:
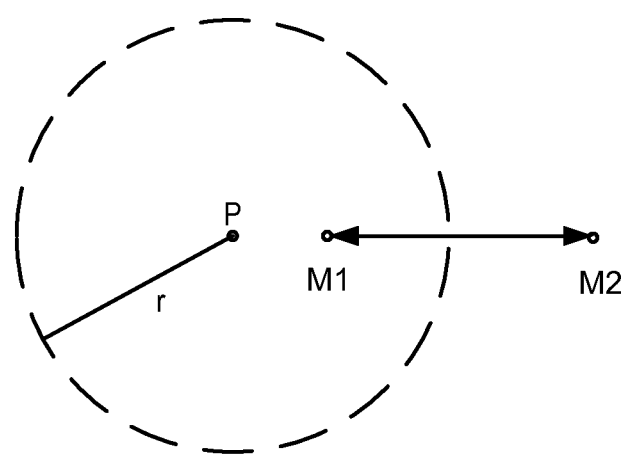
FIGS. 6A-6C are diagrams illustrating exemplary techniques of determining a sphere of influence of a motion pattern.
Figure 6B:
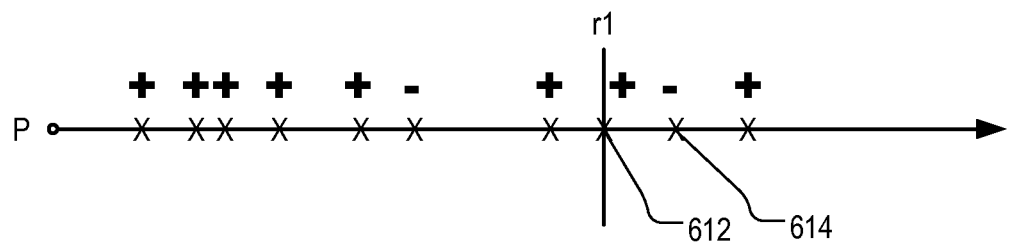
Figure 6C:
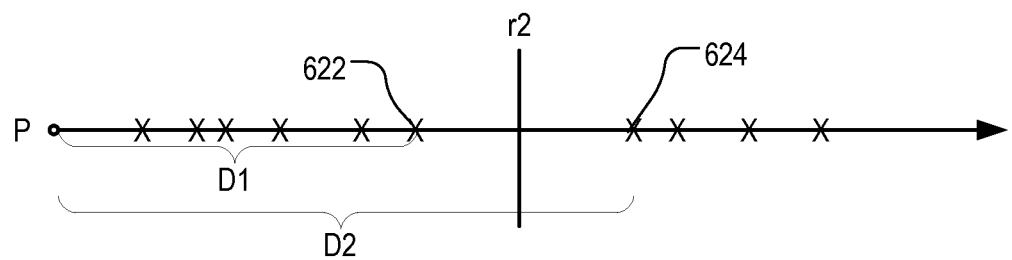

FIGS. 6A-6C are diagrams illustrating techniques for determining a sphere of influence of a motion pattern. FIG. 6A is an illustration of a SOI of a motion pattern P. The SOI has a radius r that can be used as a threshold. If a distance between a motion M1 and the motion pattern P does not exceed r, a gesture recognition system can determine that motion M1 matches motion P. The match can indicate that a gesture is recognized. If a distance between a motion M2 and the motion pattern P exceeds r, the gesture recognition system can determine that motion M2 does not match motion P.

FIG. 6B is an illustration of exemplary operations of SOI calculating subsystem 214 (as described above in reference to FIG. 2) for calculating a radius r1 of a SOI of a raw motion pattern P based on classification. SOI calculating subsystem 214 can rank motion features 204 based on a distance between each of the motion features 204 and a raw motion pattern P. SOI calculating subsystem 214 can determine the radius r1 based on a classification threshold and a classification ratio, which will be described below.

The radius r1 can be associated with a classification ratio. The classification ratio can be a ratio between a number of first class motion samples (e.g., "positive" motion samples) within distance r1 from the raw motion pattern P and a total number of motion samples (e.g., both "positive" and "negative" motion samples) within distance r1 from the motion pattern P.

SOI calculating subsystem 214 can specify a classification threshold and determine the radius r1 based on the classification threshold. SOI calculating subsystem 214 can increase the radius r1 from an initial value (e.g., 0) incrementally according to the incremental distances between the ordered motion samples and the raw motion pattern P. If, after r1 reaches a value (e.g., a distance between motion feature 612 and raw motion pattern P), a further increment of r1 to a next closest distance between a motion feature (e.g., motion feature 614) and raw motion pattern P will cause the classification ratio to be less than the classification threshold, SOI calculating subsystem 214 can designate the value of r1 as a classification radius of the ROI.

FIG. 6C is an illustration of exemplary operations of SOI calculating subsystem 214 (as described above in reference to FIG. 2) for calculating a density radius r2 of a SOI of raw motion pattern P based on variance. SOI calculating subsystem 214 can rank motion features 204 based on a distance between each of the motion features 204 and a motion pattern P. SOI calculating subsystem 214 can determine the density radius r2 based on a variance threshold and a variance value, which will be described in further detail below.

The density radius r2 can be associated with a variance value. The variance value can indicate a variance of distance between each of the motion samples that are within distance r2 of the raw motion pattern P. SOI calculating subsystem 214 can specify a variance threshold and determine the density radius r2 based on the variance threshold. SOI calculating subsystem 214 can increase a measuring distance from an initial value (e.g., 0) incrementally according to the incremental distances between the ordered motion samples and the motion pattern P. If, after the measuring distance reaches a value (e.g., a distance between motion feature 622 and raw motion pattern P), a further increment of measuring distance to a next closest distance between a motion feature (e.g., motion feature 624) and the raw motion pattern P will cause the variance value to be greater than the variance threshold, SOI calculating subsystem 214 can designate an average ((D1+D2)/2) of the distance D1 between motion feature 622 and the motion pattern P and the distance D2 between motion feature 624 and the motion pattern P as the density radius r2 of the SOI.

In some implementations, SOI calculating subsystem 214 can select the smaller between the classification radius and the density radius of an SOI as the radius of the SOI. In some implementations, SOI calculating subsystem 214 can designate a weighted average of the classification radius and the density radius of an SOI as the radius of the SOI.

Figure 7:
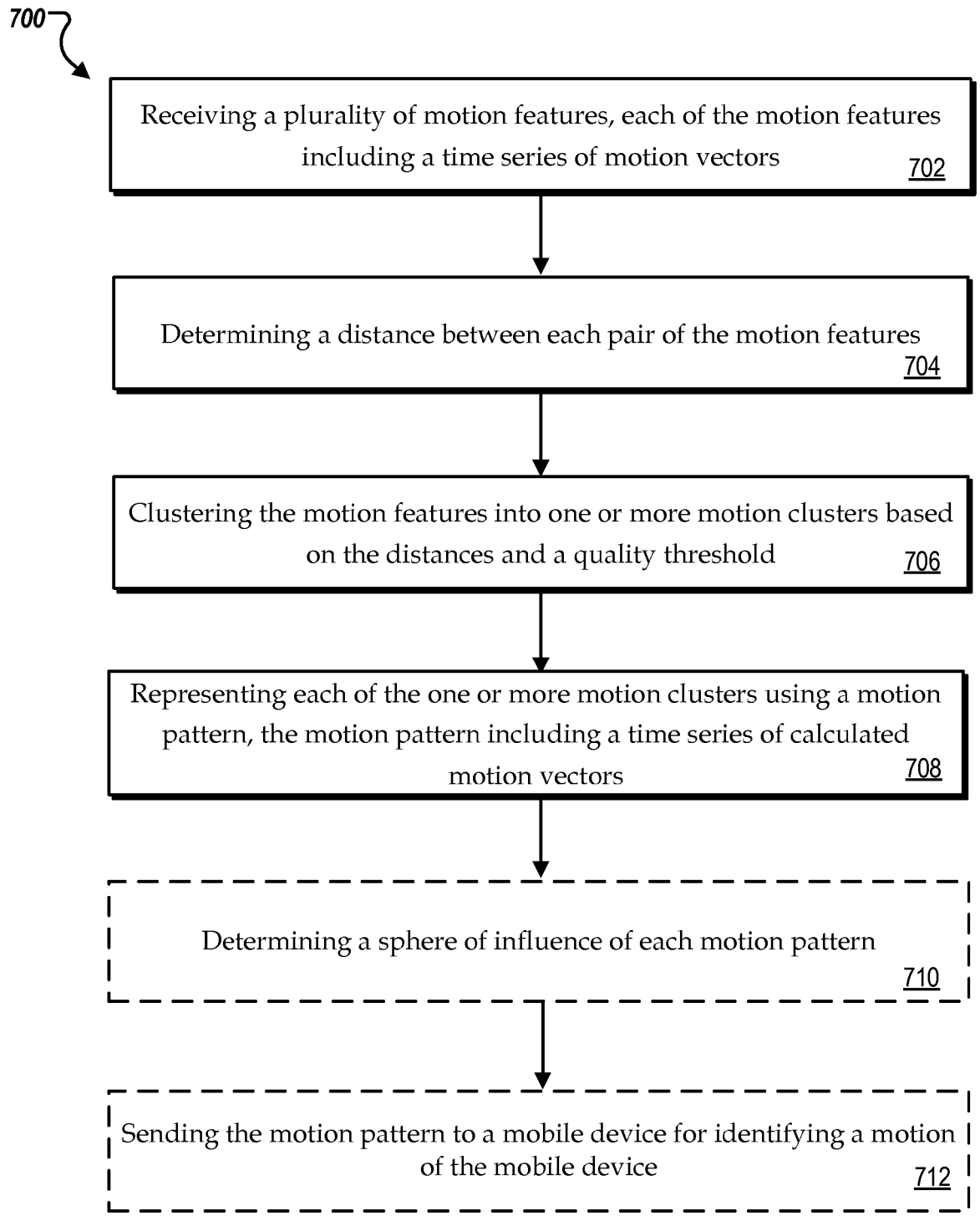
FIG. 7 is a flowchart illustrating an exemplary process of motion pattern classification.

FIG. 7 is a flowchart illustrating an exemplary process 700 of motion pattern classification. Process 700 can be implemented on a system including one or more computers.

The system can receive (702) multiple motion features. Each of the motion features can include a time series of motion vectors. Receiving the motion samples can include receiving a time series of motion sensor readings from a mobile device, and generate the time series of motion vectors of the motion features from the motion sensor readings using a high-pass filter. Each of the motion features can be associated with a label. The labels of the motion features can include a first label (e.g., "positive") and a second label (e.g., "negative").

The system can determine (704) a distance between each pair of motion features. Determining the distance between each pair of motion features can include determining the distance between a time series of motion vectors in a first motion sample in the pair and a time series of motion vectors in a second motion sample in the pair using dynamic time warping.

The system can cluster (706) the motion features into one or more motion clusters based on the distances and a quality threshold. Clustering the motion features can include applying quality threshold clustering techniques. The system can determine the quality threshold based on a distance between a motion feature having the first label and a motion feature having the second label. For example, the system can determine the quality threshold based on (1) a smallest distance between a motion feature having the first label and the motion feature label the second label, and (2) a positive multiplier.

Clustering the motion features can include identifying a first cluster of motion features, the motion features in the first cluster having a same label (e.g., "positive"), where distances between pairs of the motion features in the first cluster satisfy the quality threshold, removing the first cluster of motion features from the motion features and from further clustering, and repeating the identifying and removing. The clustering operations can terminate when a termination condition is satisfied.

The system can represent (708) each of the one or more motion clusters using a motion pattern, the motion pattern including a time series of calculated motion vectors. Representing each motion cluster using a motion pattern can include selecting a representative motion feature from the motion features in the motion cluster and designating the selected motion feature as the motion pattern. Selecting the representative motion feature can be based on a reference distance of each motion feature, the reference distance being a maximum distance between the motion feature and other motion features. The system can designate a motion feature that has the smallest reference distance as the representative motion feature.

The system can identify an outlier from the motion patterns and exclude the outlier from gesture recognition operations. The outlier can be a motion pattern that is generated based on insufficient motion samples or erroneously labeled training motions. The system can identify the outlier based on a number of motion features clustered in each of the motion clusters and the labels associated with the motion features. The system can identify an outlier cluster from the one or more motion clusters based on the following criteria: (1) each motion feature contained in the outlier cluster is associated with a first label (e.g., labeled as "positive"); (2) a number of the motion features in the outlier cluster is less than an outlier threshold (e.g., when a motion cluster contains only one motion feature); and (3) a motion pattern representing a cluster that is closest to the outlier cluster is associated with a second label.

The system can determine (710) a sphere of influence of each motion pattern based on the motion patterns and the distances between the pairs of the motion features. A motion is designated as matching the motion pattern when a distance between the motion and the motion pattern is within the sphere of influence. Determining the sphere of influence of a motion pattern can be based at least in part on one of a classification radius or a density radius. The classification radius can be determined based on a distance from the motion pattern within which a threshold portion of motion features have a same label. The density radius is determined based on a distance from the motion pattern within which a variance of distances between motion features and the motion pattern satisfies a specified variance threshold. The system can select the smaller of the classification radius and the density radius as the radius of the sphere of influence.

The system can send (712) the motion pattern to a mobile device for recognizing a gesture of the mobile device. Operations of recognizing a gesture of the mobile device will be described below in reference FIGS. 8-10.

Exemplary Gesture Recognition

Figure 8:
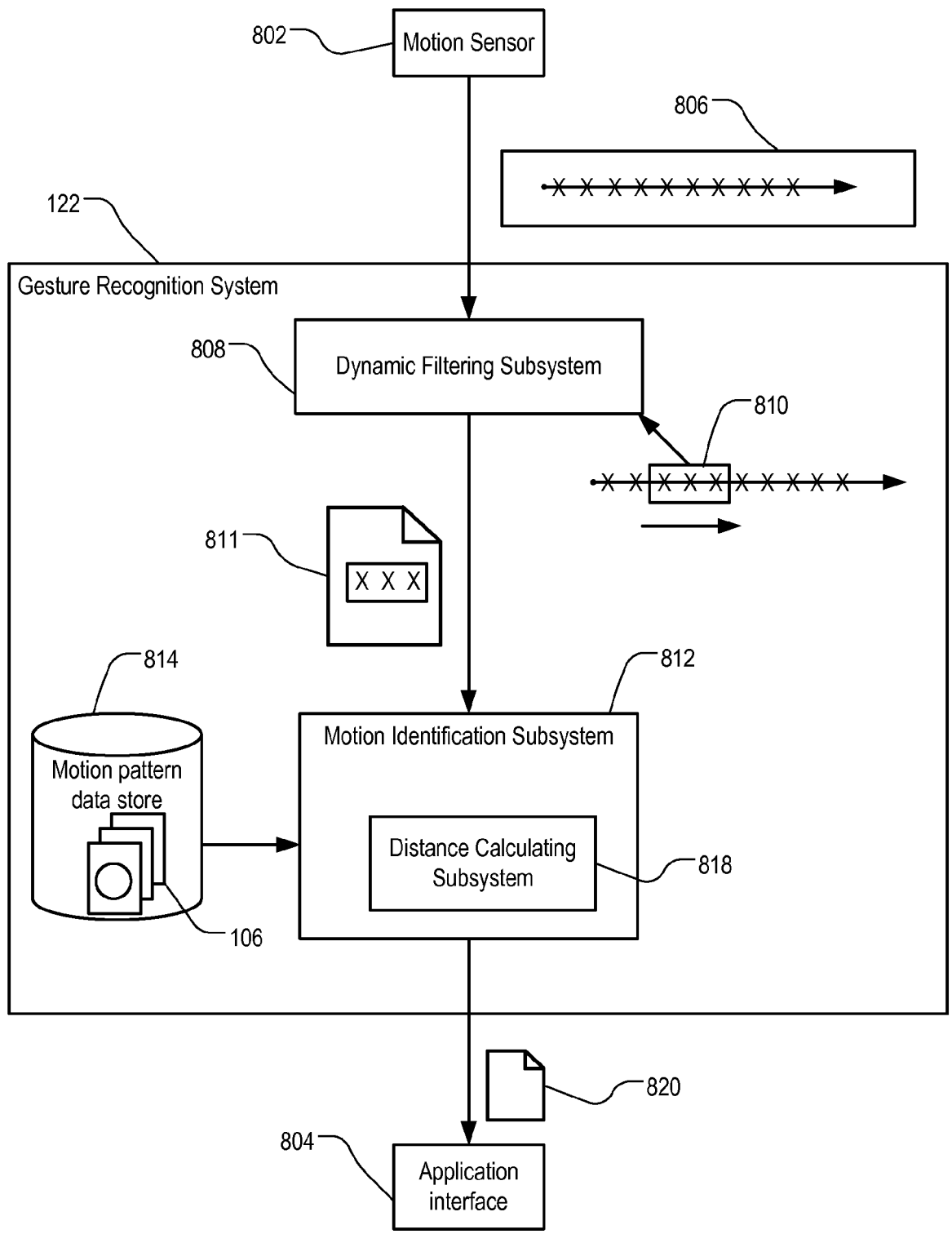
FIG. 8 is a block diagram illustrating an exemplary system configured to perform operations of gesture recognition.

FIG. 8 is a block diagram illustrating an exemplary system configured to perform operations of gesture recognition. The system can include motion sensor 802, gesture recognition system 122 (as described in reference to FIG. 1), and application interface 804. The system can be implemented on a mobile device.

Motion sensor 802 can be a component of a mobile device that is configured to measure accelerations in multiple axes and produces motion sensor readings 806 based on the measured accelerations. Motion sensor readings 806 can include a time series of acceleration vectors.

Gesture recognition system 122 can be configured to receive and process motion sensor readings 806. Gesture recognition system 122 can include dynamic filtering subsystem 808. Dynamic filtering subsystem 808 is a component of the gesture recognition system that is configured to perform dynamic filtering on motion sensor readings 806 in a manner similar to the operations of dynamic filtering subsystem 202 (as described in reference to FIGS. 2-3). In addition, dynamic filtering subsystem 808 can be configured to select a portion of motion sensor readings 806 for further processing. The selection can be based on sliding time window 810. Motion sensor 802 can generate motion sensor readings 806 continuously. Dynamic filtering subsystem 808 can use the sliding time window 810 to select segments of the continuous data, and generate normalized motion sensor readings 811 based on the selected segments.

Gesture recognition system 122 can include motion identification subsystem 812. Motion identification subsystem 812 is a component of gesture recognition system 122 that is configure to determine whether normalized motion sensor readings 811 match a known motion pattern. Motion identification subsystem 812 can receive normalized motion sensor readings 811, and access motion pattern data store 814. Motion pattern data store 814 includes a storage device that stores one or more motion patterns 106, which are described in further detail in reference to FIGS. 1-2. Motion identification subsystem 812 can compare the received normalized motion sensor readings 811 with each of the stored motion patterns 106, and recognize a gesture based on the comparison.

Motion identification subsystem 812 can include distance calculating subsystem 818. Distance calculating subsystem 818 is a component of motion identification subsystem 812 that is configured to calculate a distance between normalized motion sensor readings 811 and each of the motion patterns 106. If the distance between normalized motion sensor readings 811 and a motion pattern P is within the radius of an SOI of the motion pattern P, motion identification subsystem 812 can identify a match and recognize a gesture 820. Further details of the operations of distance calculating subsystem 818 will be described below in reference to FIGS. 9A-9B.

Motion identification subsystem 812 can send the recognized gesture 820 to application interface 804. An application program or a system function of the mobile device can receive the gesture from application interface 804 and perform a task (e.g., turning off a touch-input screen) in response.

Figure 9A:
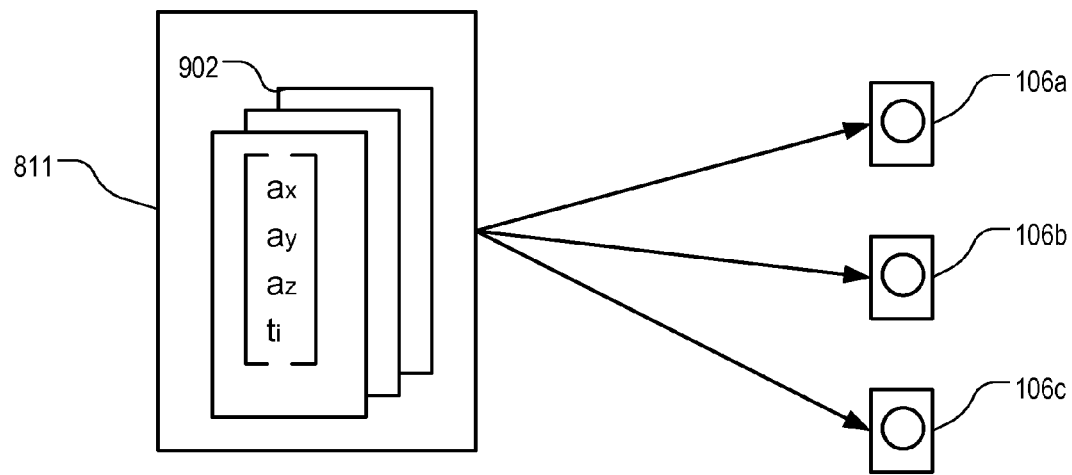
FIGS. 9A-9B are diagrams illustrating exemplary techniques of matching motion sensor readings to a motion pattern.
Figure 9B:
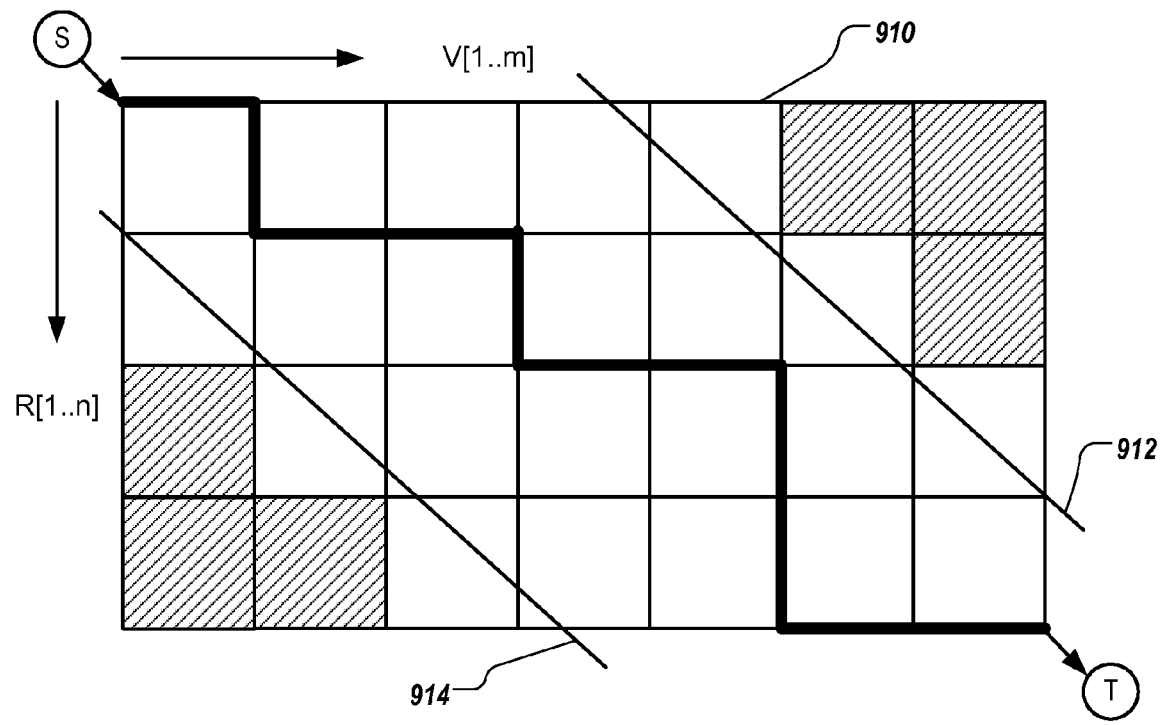

FIGS. 9A-9B are diagrams illustrating techniques of matching motion sensor readings to a motion pattern. FIG. 9A illustrates an example data structure of normalized motion sensor readings 811 as described in reference to FIG. 8 above. Normalized motion sensor readings 811 can include a series of motion vectors 902. Each motion vector 902 can include acceleration readings $a_x$, $a_y$, and $a_z$, for axes X, Y, and Z, respectively. In some implementations, each motion vector 902 can be associated with a time $t_i$, the time defining the time series. In some implementations, the normalized motion sensor readings 811 designate the time dimension of the time series using an order of the motion vectors 902. In these implementations, the time can be omitted.

Distance calculating subsystem 818 (as described above in reference to FIG. 8) compares normalized motion sensor readings 811 to each of the motion patterns 106a, 106b, and 106c. The operations of comparison are described in further detail below in reference to FIG. 9B. A match between normalized motion sensor readings 811 and any of the motion patterns 106a, 106b, and 106c can result in a recognition of a gesture.

FIG. 9B is a diagram illustrating distance calculating operations of distance calculating subsystem 818. To perform the comparison, distance calculating subsystem 818 can calculate a distance between the normalized motion sensor readings 811, which can include readings R1, Rn, and a motion pattern (e.g., motion pattern 106a, 106b, or 106c), which can include motion vectors V1 . . . Vm. Distance calculating subsystem 818 can calculate the distance using directed graph 910 in operations similar to those described in reference to FIG. 4.

In some implementations, distance calculating subsystem 818 can perform optimization on the comparing. Distance calculating subsystem 818 can perform the optimization by applying comparison thresholds 912 and 914. Comparison thresholds 912 and 914 can define a series of vector pairs between which distance calculating subsystem 818 performs a distance calculation. By applying comparison thresholds 912 and 914, distance calculating subsystem 818 can exclude those calculations that are unlikely to yield a match. For example, a distance calculation between the first motion vector R1 in the normalized motion sensor readings 811 and a last motion vector Vm of a motion pattern is unlikely to lead to a match, and therefore can be omitted from the calculations. The optimization can be applied in a similar manner to operations described above in reference to FIG. 4.

Distance calculating subsystem 818 can determine a shortest path (e.g., the path marked in bold lines) in directed graph 910, and designate the cost of the shortest path as a distance between normalized motion sensor readings 811 and a motion pattern. Distance calculating subsystem 818 can compare the distance with a SOI associated with the motion pattern. If the distance is less than the SOI, distance calculating subsystem 818 can identify a match.

Figure 10:
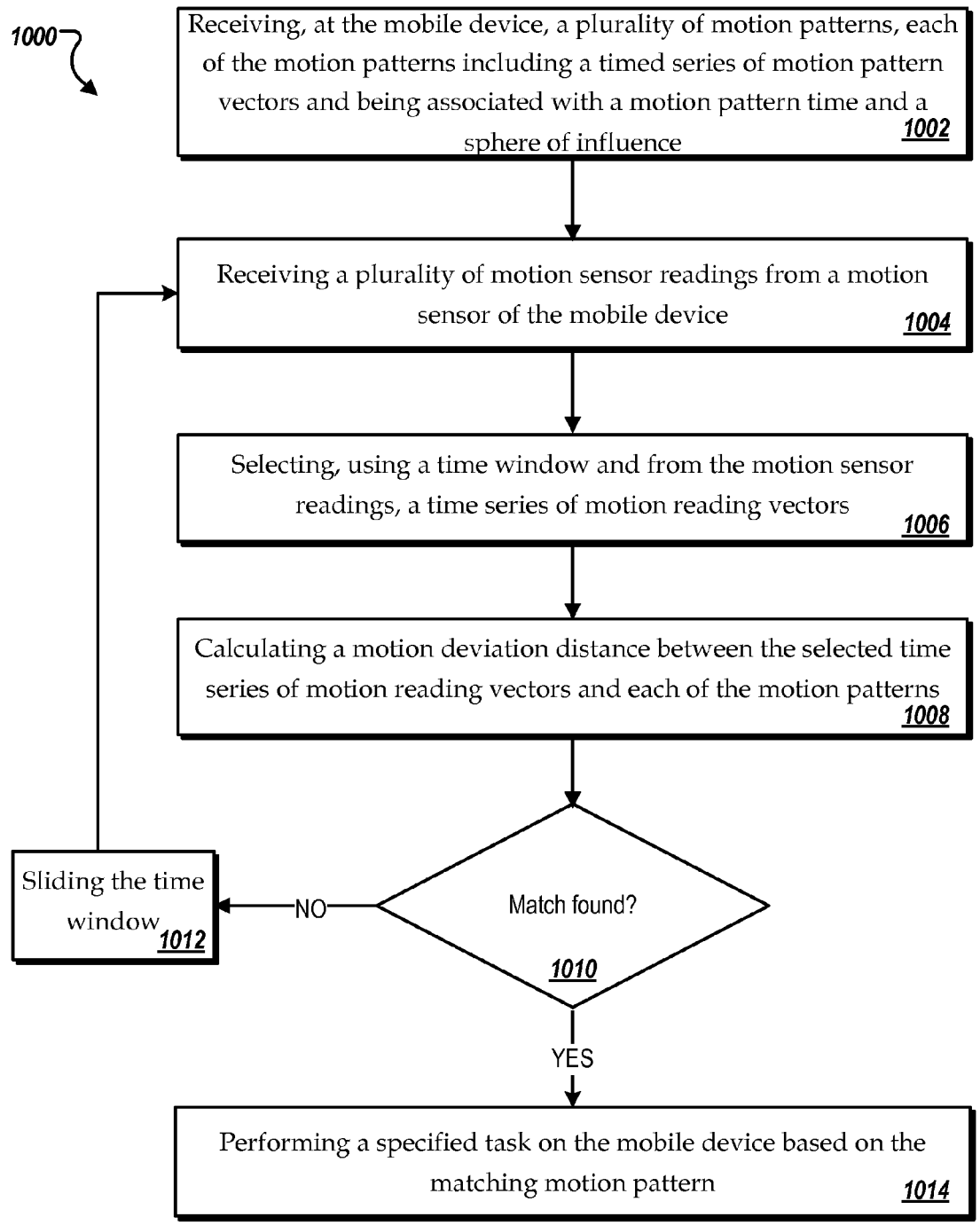
FIG. 10 is a flowchart illustrating an exemplary process of pattern-based gesture recognition.

FIG. 10 is a flowchart illustrating exemplary process 1000 of pattern-based gesture recognition. The process can be executed by a system including a mobile device.

The system can receive (1002) multiple motion patterns. Each of the motion patterns can include a time series of motion vectors. For clarity, the motion vectors in the motion patterns will be referred to as motion pattern vectors. Each of the motion patterns can be associated with an SOI. Each motion pattern vector can include a linear acceleration value, an angular rate value, or both, on each of multiple motion axes. In some implementations, each of the motion pattern vectors can include an angular rate value on each of pitch, roll, and yaw. Each of the motion patterns can include gyroscope data determined based on a gyroscope device of the mobile device, magnetometer data determined based on a magnetometer device of the mobile device, or gravimeter data from a gravimeter device of the mobile device. Each motion pattern vector can be associated with a motion pattern time. In some implementations, the motion pattern time is implied in the ordering of the motion pattern vectors.

The system can receive (1004) multiple motion sensor readings from a motion sensor built into or coupled with the system. The motion sensor readings can include multiple motion vectors, which will be referred to as motion reading vectors. Each motion reading vector can correspond to a timestamp, which can indicate a motion reading time. In some implementations, each motion reading vector can include an acceleration value on each of the axes as measured by the motion sensor, which includes an accelerometer. In some implementations, each motion reading vector can include a transformed acceleration value that is calculated based on one or more acceleration values as measured by the motion sensor. The transformation can include high-pass filtering, time-dimension compression, or other manipulations of the acceleration values. In some implementations, the motion reading time is implied in the ordering of the motion reading vectors.

The system can select (1006), using a time window and from the motion sensor readings, a time series of motion reading vectors. The time window can include a specified time period and a beginning time. In some implementations, transforming the acceleration values can occur after the selection stage. The system can transform the selected time series of acceleration values.

The system can calculate (1008) a distance between the selected time series of motion reading vectors and each of the motion patterns. This distance will be referred to as a motion deviation distance. Calculating the motion deviation distance can include applying dynamic time warping based on the motion pattern times of the motion pattern and the motion reading times of the series of motion reading vectors. Calculating the motion deviation distance can include calculating a vector distance between (1) each motion reading vector in the selected time series of motion reading vectors, and (2) each motion pattern vector in the motion pattern. The system can then calculate the motion deviation distance based on each vector distance. Calculating the motion deviation distance based on each vector distance can include identifying a series of vector distances ordered according to the motion pattern times and the motion reading times (e.g., the identified shortest path described above with respect to FIG. 9B). The system can designate a measurement of the vector distances in the identified series as the motion deviation distance. The measurement can include at least one of a sum or a weighted sum of the vector distances in the identified series. The vector distances can include at least one of a Euclidean distance between a motion pattern vector and a motion reading vector or a Manhattan distance between a motion pattern vector and a motion reading vector.

The system can determine (1010) whether a match is found. Determining whether a match is found can include determining whether, according to a calculated motion deviation distance, the selected time series of motion reading vectors is located within the sphere of influence of a motion pattern (e.g., motion pattern P).

If a match is not found, the system slides (1012) the time window along a time dimension on the received motion sensor readings. Sliding the time window can include increasing the beginning time of the time window. The system can then perform operations 1004, 1006, 1008, and 1010 until a match is found, or until all the motion patterns have been compared against and no match is found.

If a match is found, a gesture is recognized. The system can designate the motion pattern P as a matching motion pattern. The system can perform (1014) a specified task based on the matching motion pattern. Performing the specific task can include at least one of: changing a configuration of a mobile device; providing a user interface for display, or removing a user interface from display on a mobile device; launching or terminating an application program on a mobile device; or initiating or terminating a communication between a mobile device and another device. Changing the configuration of the mobile device includes changing an input mode of the mobile device between a touch screen input mode and a voice input mode.

In some implementations, before performing the specified task, the system can apply confirmation operations to detect and eliminate false positives in matching. The confirmation operations can include examining a touch-screen input device or a proximity sensor of the mobile device. For example, if the gesture is "picking up the device," the device can confirm the gesture by examining proximity sensor readings to determine that the device is proximity to an object (e.g., a human face) at the end of the gesture.

Exemplary Mobile Device Architecture

Figure 11:
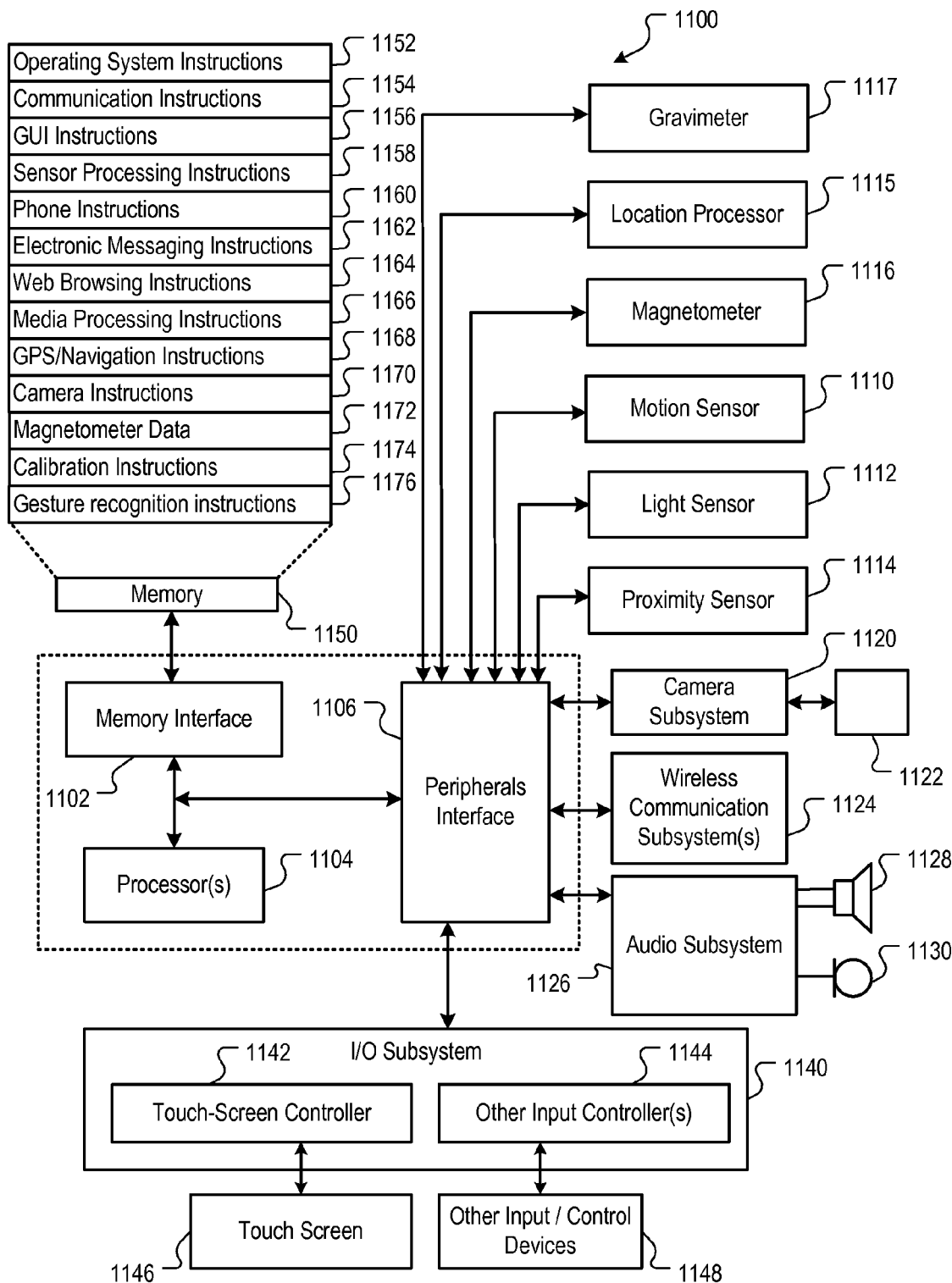
FIG. 11 is a block diagram illustrating an exemplary device architecture of a mobile device implementing the features and operations of pattern-based gesture recognition.

FIG. 11 is a block diagram illustrating an exemplary device architecture 1100 of a mobile device implementing the features and operations of pattern-based gesture recognition. A mobile device can include memory interface 1102, one or more data processors, image processors and/or processors 1104, and peripherals interface 1106. Memory interface 1102, one or more processors 1104 and/or peripherals interface 1106 can be separate components or can be integrated in one or more integrated circuits. Processors 1104 can include one or more application processors (APs) and one or more baseband processors (BPs). The application processors and baseband processors can be integrated in one single process chip. The various components in a mobile device, for example, can be coupled by one or more communication buses or signal lines.

Sensors, devices, and subsystems can be coupled to peripherals interface 1106 to facilitate multiple functionalities. For example, motion sensor 1110, light sensor 1112, and proximity sensor 1114 can be coupled to peripherals interface 1106 to facilitate orientation, lighting, and proximity functions of the mobile device. Location processor 1115 (e.g., GPS receiver) can be connected to peripherals interface 1106 to provide geopositioning. Electronic magnetometer 1116 (e.g., an integrated circuit chip) can also be connected to peripherals interface 1106 to provide data that can be used to determine the direction of magnetic North. Thus, electronic magnetometer 1116 can be used as an electronic compass. Motion sensor 1110 can include one or more accelerometers configured to determine change of speed and direction of movement of the mobile device. Gravimeter 1117 can include one or more devices connected to peripherals interface 1106 and configured to measure a local gravitational field of Earth.

Camera subsystem 1120 and an optical sensor 1122, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 1124, which can include radio frequency receivers and transmitters and/or optical (e.g., infrared) receivers and transmitters. The specific design and implementation of the communication subsystem 1124 can depend on the communication network(s) over which a mobile device is intended to operate. For example, a mobile device can include communication subsystems 1124 designed to operate over a CDMA system, a WiFi™ or WiMax™ network, and a Bluetooth™ network. In particular, the wireless communication subsystems 1124 can include hosting protocols such that the mobile device can be configured as a base station for other wireless devices.

Audio subsystem 1126 can be coupled to a speaker 1128 and a microphone 1130 to facilitate voice-enabled functions, such as voice recognition, voice replication, digital recording, and telephony functions.

I/O subsystem 1140 can include touch screen controller 1142 and/or other input controller(s) 1144. Touch-screen controller 1142 can be coupled to a touch screen 1146 or pad. Touch screen 1146 and touch screen controller 1142 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch screen 1146.

Other input controller(s) 1144 can be coupled to other input/control devices 1148, such as one or more buttons, rocker switches, thumb-wheel, infrared port, USB port, and/ or a pointer device such as a stylus. The one or more buttons (not shown) can include an up/down button for volume control of speaker 1128 and/or microphone 1130.

In one implementation, a pressing of the button for a first duration may disengage a lock of the touch screen 1146; and a pressing of the button for a second duration that is longer than the first duration may turn power to a mobile device on or off. The user may be able to customize a functionality of one or more of the buttons. The touch screen 1146 can, for example, also be used to implement virtual or soft buttons and/or a keyboard.

In some implementations, a mobile device can present recorded audio and/or video files, such as MP3, AAC, and MPEG files. In some implementations, a mobile device can include the functionality of an MP3 player, such as an iPod™. A mobile device may, therefore, include a pin connector that is compatible with the iPod. Other input/output and control devices can also be used.

Memory interface 1102 can be coupled to memory 1150. Memory 1150 can include high-speed random access memory and/or non-volatile memory, such as one or more magnetic disk storage devices, one or more optical storage devices, and/or flash memory (e.g., NAND, NOR). Memory 1150 can store operating system 1152, such as Darwin, RTXC, LINUX, UNIX, OS X, WINDOWS, or an embedded operating system such as VxWorks. Operating system 1152 may include instructions for handling basic system services and for performing hardware dependent tasks. In some implementations, operating system 1152 can include a kernel (e.g., UNIX kernel).

Memory 1150 may also store communication instructions 1154 to facilitate communicating with one or more additional devices, one or more computers and/or one or more servers. Memory 1150 may include graphical user interface instructions 1156 to facilitate graphic user interface processing; sensor processing instructions 1158 to facilitate sensor-related processing and functions; phone instructions 1160 to facilitate phone-related processes and functions; electronic messaging instructions 1162 to facilitate electronic-messaging related processes and functions; web browsing instructions 1164 to facilitate web browsing-related processes and functions; media processing instructions 1166 to facilitate media processing-related processes and functions; GPS/Navigation instructions 1168 to facilitate GPS and navigation-related processes and instructions; camera instructions 1170 to facilitate camera-related processes and functions; magnetometer data 1172 and calibration instructions 1174 to facilitate magnetometer calibration. The memory 1150 may also store other software instructions (not shown), such as security instructions, web video instructions to facilitate web video-related processes and functions, and/or web shopping instructions to facilitate web shopping-related processes and functions. In some implementations, the media processing instructions 1166 are divided into audio processing instructions and video processing instructions to facilitate audio processing-related processes and functions and video processing-related processes and functions, respectively. An activation record and International Mobile Equipment Identity (IMEI) or similar hardware identifier can also be stored in memory 1150. Memory 1150 can include gesture recognition instructions 1176. Gesture recognition instructions 1176 can be a computer program product that is configured to cause the mobile device to recognize one or more gestures using motion patterns, as described in reference to FIGS. 1-10.

Each of the above identified instructions and applications can correspond to a set of instructions for performing one or more functions described above. These instructions need not be implemented as separate software programs, procedures, or modules. Memory 1150 can include additional instructions or fewer instructions. Furthermore, various functions of the mobile device may be implemented in hardware and/or in software, including in one or more signal processing and/or application specific integrated circuits.

Exemplary Operating Environment

Figure 12:
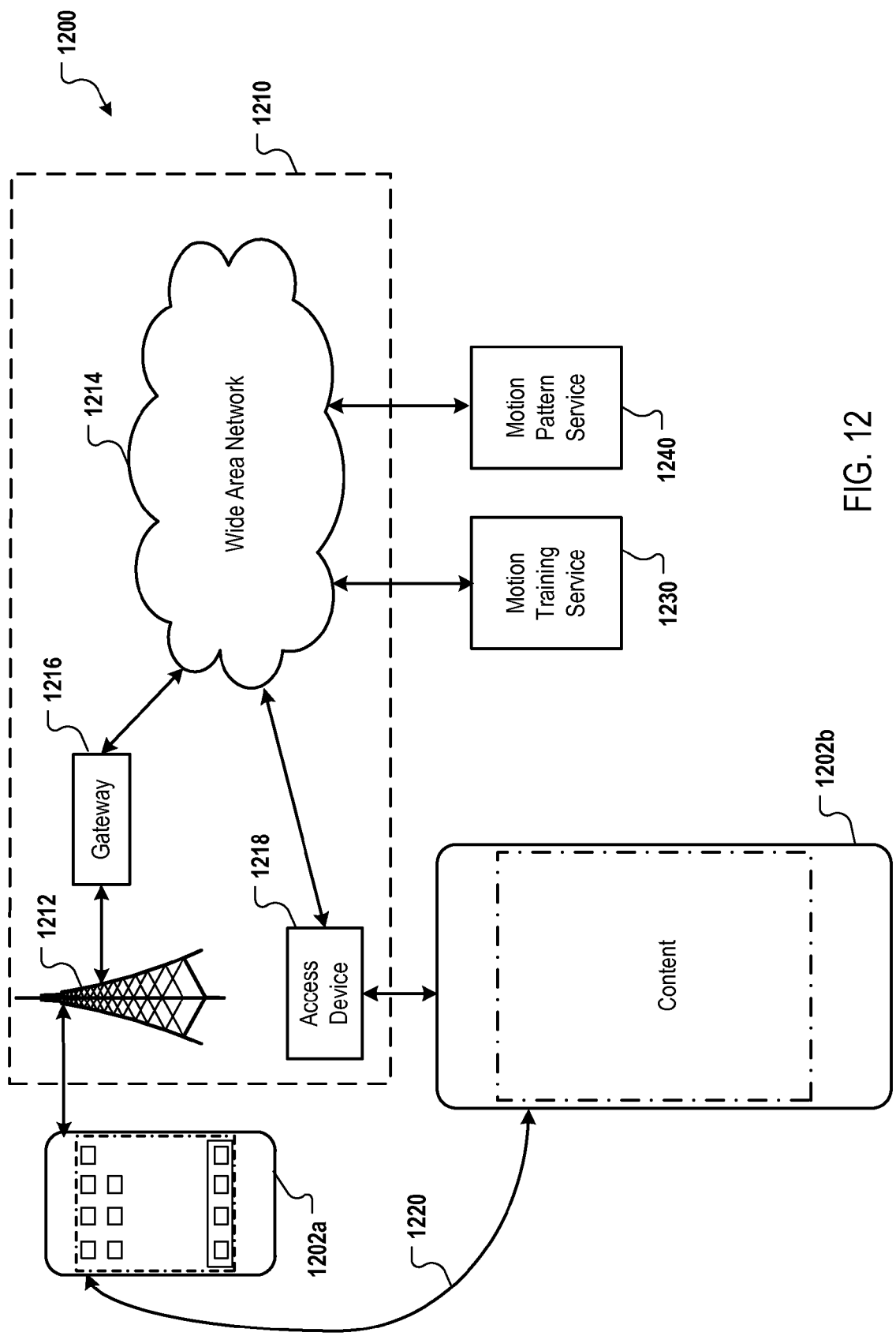
FIG. 12 is a block diagram of exemplary network operating environment for the mobile devices implementing motion pattern classification and gesture recognition techniques.

FIG. 12 is a block diagram of exemplary network operating environment 1200 for the mobile devices implementing motion pattern classification and gesture recognition techniques. Mobile devices 1202a and 1202b can, for example, communicate over one or more wired and/or wireless networks 1210 in data communication. For example, a wireless network 1212, e.g., a cellular network, can communicate with a wide area network (WAN) 1214, such as the Internet, by use of a gateway 1216. Likewise, an access device 1218, such as an 802.11g wireless access device, can provide communication access to the wide area network 1214.

In some implementations, both voice and data communications can be established over wireless network 1212 and the access device 1218. For example, mobile device 1202a can place and receive phone calls (e.g., using voice over Internet Protocol (VoIP) protocols), send and receive e-mail messages (e.g., using Post Office Protocol 3 (POP3)), and retrieve electronic documents and/or streams, such as web pages, photographs, and videos, over wireless network 1212, gateway 1216, and wide area network 1214 (e.g., using Transmission Control Protocol/Internet Protocol (TCP/IP) or User Datagram Protocol (UDP)). Likewise, in some implementations, the mobile device 1202b can place and receive phone calls, send and receive e-mail messages, and retrieve electronic documents over the access device 1218 and the wide area network 1214. In some implementations, mobile device 1202a or 1202b can be physically connected to the access device 1218 using one or more cables and the access device 1218 can be a personal computer. In this configuration, mobile device 1202a or 1202b can be referred to as a "tethered" device.

Mobile devices 1202a and 1202b can also establish communications by other means. For example, wireless mobile device 1202a can communicate with other wireless devices, e.g., other mobile devices 1202a or 1202b, cell phones, etc., over the wireless network 1212. Likewise, mobile devices 1202a and 1202b can establish peer-to-peer communications 1220, e.g., a personal area network, by use of one or more communication subsystems, such as the Bluetooth™ communication devices. Other communication protocols and topologies can also be implemented.

The mobile device 1202a or 1202b can, for example, communicate with one or more services 1230 and 1240 over the one or more wired and/or wireless networks. For example, one or more motion training services 1230 can be used to determine one or more motion patterns. Motion pattern service 1240 can provide the one or more one or more motion patterns to mobile devices 1202a and 1202b for recognizing gestures.

Mobile device 1202a or 1202b can also access other data and content over the one or more wired and/or wireless networks. For example, content publishers, such as news sites, Rally Simple Syndication (RSS) feeds, web sites, blogs, social networking sites, developer networks, etc., can be accessed by mobile device 1202a or 1202b. Such access can be provided by invocation of a web browsing function or application (e.g., a browser) in response to a user touching, for example, a Web object.

Exemplary System Architecture

Figure 13:
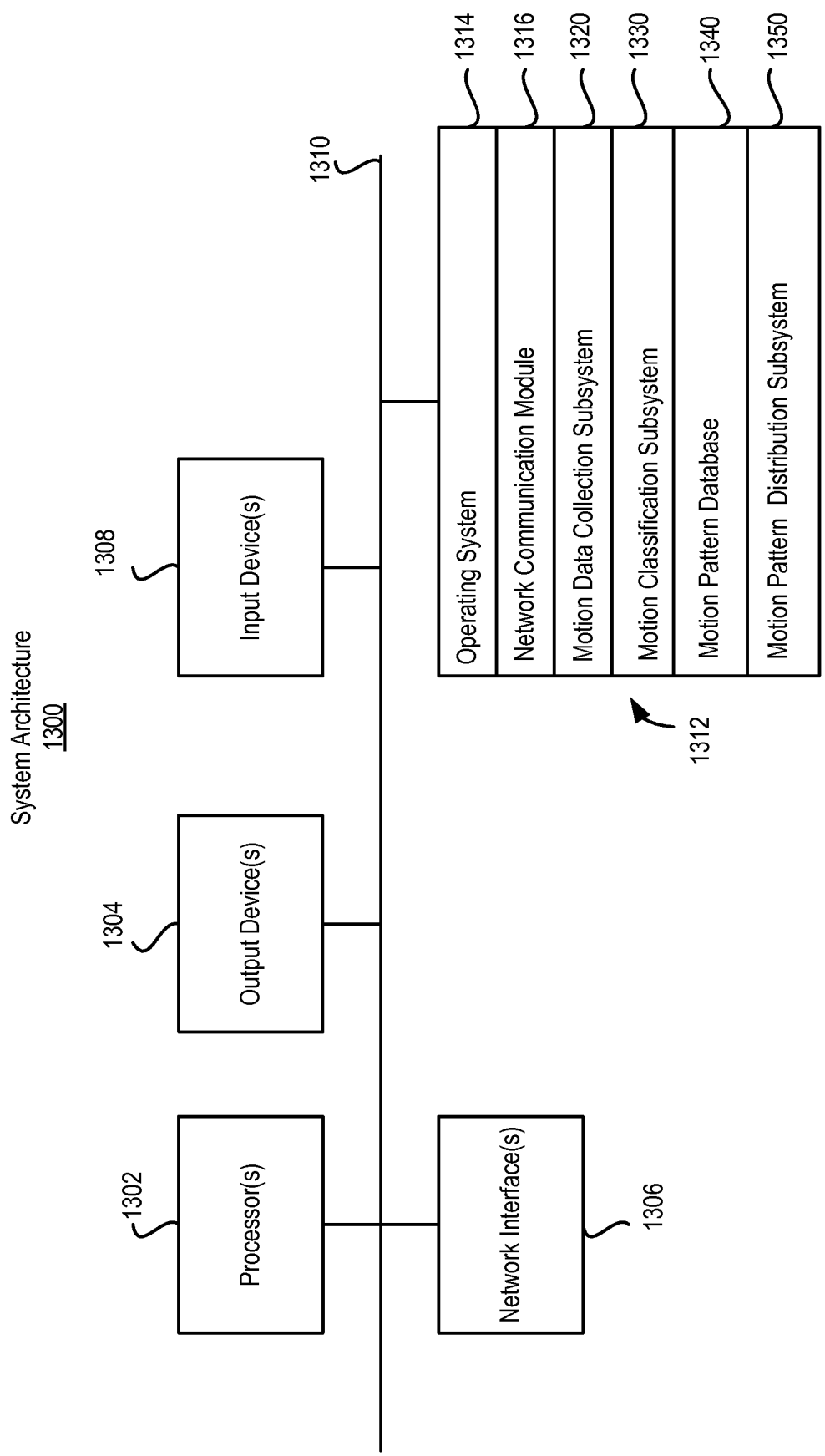
FIG. 13 is a block diagram of an exemplary system architecture for implementing the features and operations of motion pattern classification and gesture recognition.

FIG. 13 is a block diagram of an exemplary system architecture for implementing the features and operations of motion pattern classification and gesture recognition. Other architectures are possible, including architectures with more or fewer components. In some implementations, architecture 1300 includes one or more processors 1302 (e.g., dual-core Intel® Xeon® Processors), one or more output devices 1304 (e.g., LCD), one or more network interfaces 1306, one or more input devices 1308 (e.g., mouse, keyboard, touch-sensitive display) and one or more computer-readable media 1312 (e.g., RAM, ROM, SDRAM, hard disk, optical disk, flash memory, etc.). These components can exchange communications and data over one or more communication channels 1310 (e.g., buses), which can utilize various hardware and software for facilitating the transfer of data and control signals between components.

The term "computer-readable medium" refers to any medium that participates in providing instructions to processor 1302 for execution, including without limitation, non-volatile media (e.g., optical or magnetic disks), volatile media (e.g., memory) and transmission media. Transmission media includes, without limitation, coaxial cables, copper wire and fiber optics.

Computer-readable medium 1312 can further include operating system 1314 (e.g., Mac OS® server, Windows® NT server), network communications module 1316, motion data collection subsystem 1320, motion classification subsystem 1330, motion pattern database 1340, and motion pattern distribution subsystem 1350. Motion data collection subsystem 1320 can be configured to receive motion samples from mobile devices. Motion classification subsystem 1330 can be configured to determine one or more motion patterns from the received motion samples. Motion pattern database 1340 can store the motion patterns. Motion pattern distribution subsystem 1350 can be configured to distribute the motion patterns to mobile devices. Operating system 1314 can be multi-user, multiprocessing, multitasking, multi-threading, real time, etc. Operating system 1314 performs basic tasks, including but not limited to: recognizing input from and providing output to devices 1306, 1308; keeping track and managing files and directories on computer-readable media 1312 (e.g., memory or a storage device); controlling peripheral devices; and managing traffic on the one or more communication channels 1310. Network communications module 1316 includes various components for establishing and maintaining network connections (e.g., software for implementing communication protocols, such as TCP/IP, HTTP, etc.). Computer-readable medium 1312 can further include a database interface. The database interface can include interfaces to one or more databases on a file system. The databases can be organized under a hierarchical folder structure, the folders mapping to directories in the file system.

Architecture 1300 can be included in any device capable of hosting a database application program. Architecture 1300 can be implemented in a parallel processing or peer-to-peer infrastructure or on a single device with one or more processors. Software can include multiple software components or can be a single body of code.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, a browser-based web application, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

A number of implementations of the invention have been described. Nevertheless, it will be understood that various modifications can be made without departing from the spirit and scope of the invention.

What is claimed is:

1. A method performed by one or more computers, comprising:
   receiving a plurality of motion features, each of the motion features including a respective time series of motion vectors and a first label or a second label;
   determining a respective distance between each pair of the motion features that includes a first motion feature having the first label and a second motion feature having the second label;
   clustering the motion features into one or more motion clusters based on the distance and a quality threshold, the quality threshold being determined based at least in part on a smallest distance between a motion feature having the first label and a motion feature having the second label; and
   representing each of the one or more motion clusters using a motion pattern for recognizing a gesture on a mobile device, the motion pattern including a time series of calculated motion vectors.

2. The method of claim 1, wherein each motion vector includes at least one of:
   a linear acceleration value on each of a plurality of motion axes;
   an angular rate value each of a plurality of motion axes;
   magnetometer data; or
   proximity sensor data.

3. The method of claim 2, wherein receiving the motion features comprises:
   receiving a time series of motion sensor readings from a mobile device; and
   generating the time series of motion vectors of each motion feature from the motion sensor readings using a high-pass filter.

4. The method of claim 1, wherein determining the respective distance includes determining a distance between a time series of motion vectors in a first motion example in the pair and a time series of motion vectors in a second motion example in the pair using dynamic time warping.

5. The method of claim 1, wherein the first label is a positive label indicating that the motion feature is associated with a given gesture, and the second label is a negative label indicating that the motion feature is not associated with the given gesture.

6. The method of claim 5, wherein determining the quality threshold is based at least in part on
   a positive multiplier.

7. The method of claim 5, comprising:
   identifying an outlier from the motion patterns based on a number of motion features clustered in each of the motion clusters and the labels associated with the motion features; and
   excluding the outlier from gesture recognition operations.

8. The method of claim 7, wherein identifying the outlier comprises:
   identifying an outlier cluster from the one or more motion clusters, wherein:
      the outlier cluster is associated with the first label;
      a number of the motion features contained in the outlier cluster is less than an outlier threshold; and
      a motion pattern representing a cluster that is closest to the outlier cluster is associated with the second label; and
   designating the motion pattern representing the outlier cluster as the outlier.

9. The method of claim 1, wherein clustering the motion features into one or more motion clusters comprises:
   identifying a first cluster of motion features, the motion features in the first cluster having a same label, wherein distances between pairs of the motion features in the first cluster satisfy the quality threshold;
   removing the first cluster from the motion features; and
   repeating the identifying and removing operations until a termination condition is satisfied.

10. The method of claim 1, comprising determining a sphere of influence of each motion pattern based on the motion patterns and the distances between the pairs of the motion features, wherein a motion is designated as matching the motion pattern when a distance between the motion and the motion pattern is within the sphere of influence.

11. The method of claim 10, wherein determining the sphere of influence includes determining the sphere of influence based at least in part on one of a classification radius or a density radius, wherein:
   the classification radius is determined based on a distance from the motion pattern within which a threshold portion of motion features have a same label, and
   the density radius is determined based on a distance from the motion pattern within which a variance of distances between motion features and the motion pattern satisfies a specified variance threshold.

12. The method of claim 1, comprising:
   sending the motion pattern to a mobile device for recognizing a gesture of the mobile device.

13. A non-transitory storage device storing a computer program product configured to cause one or more computers to perform operations comprising:
   receiving a plurality of motion features, each of the motion features including a respective time series of motion vectors and being associated with a first label or a second label;

determining a respective distance between each pair of the motion features that includes a first motion feature having the first label and a second motion feature having the second label;

clustering the motion features into one or more motion clusters based on the distance and a quality threshold, the quality threshold being determined based at least in part on a smallest distance between a motion feature having the first label and a motion feature having the second label; and representing each of the one or more motion clusters using a motion pattern for recognizing a gesture on a mobile device, the motion pattern including a time series of calculated motion vectors.

14. The non-transitory storage device of claim 13, wherein each motion vector includes at least one of:
a linear acceleration value on each of a plurality of motion axes;
an angular rate value each of a plurality of motion axes;
magnetometer data; or
proximity sensor data.

15. The non-transitory storage device of claim 14, wherein receiving the motion features comprises:
receiving a time series of motion sensor readings from a mobile device; and
generating the time series of motion vectors of each motion feature from the motion sensor readings using a high-pass filter.

16. The non-transitory storage device of claim 13, wherein determining the respective distance includes determining a distance between a time series of motion vectors in a first motion example in the pair and a time series of motion vectors in a second motion example in the pair using dynamic time warping.

17. The non-transitory storage device of claim 13, wherein the first label is a positive label indicating that the motion feature is associated with a given gesture, and the second label is a negative label indicating that the motion feature is not associated with the given gesture.

18. The non-transitory storage device of claim 17, wherein determining the quality threshold is based at least in part on a positive multiplier.

19. The non-transitory storage device of claim 17, the operations comprising:
identifying an outlier from the motion patterns based on a number of motion features clustered in each of the motion clusters and the labels associated with the motion features; and
excluding the outlier from gesture recognition operations.

20. The non-transitory storage device of claim 19, wherein identifying the outlier comprises:
identifying an outlier cluster from the one or more motion clusters, wherein:
the outlier cluster is associated with the first label;
a number of the motion features contained in the outlier cluster is less than an outlier threshold; and
a motion pattern representing a cluster that is closest to the outlier cluster is associated with the second label; and
designating the motion pattern representing the outlier cluster as the outlier.

21. The non-transitory storage device of claim 13, wherein clustering the motion features into one or more motion clusters comprises:
identifying a first cluster of motion features, the motion features in the first cluster having a same label, wherein distances between pairs of the motion features in the first cluster satisfy the quality threshold;
removing the first cluster from the motion features; and
repeating the identifying and removing operations until a termination condition is satisfied.

22. The non-transitory storage device of claim 13, the operations comprising determining a sphere of influence of each motion pattern based on the motion patterns and the distances between the pairs of the motion features, wherein a motion is designated as matching the motion pattern when a distance between the motion and the motion pattern is within the sphere of influence.

23. The non-transitory storage device of claim 22, wherein determining the sphere of influence includes determining the sphere of influence based at least in part on one of a classification radius or a density radius, wherein:
the classification radius is determined based on a distance from the motion pattern within which a threshold portion of motion features have a same label, and
the density radius is determined based on a distance from the motion pattern within which a variance of distances between motion features and the motion pattern satisfies a specified variance threshold.

24. The non-transitory storage device of claim 13, the operations comprising:
sending the motion pattern to a mobile device for recognizing a gesture of the mobile device.

25. A system, comprising:
one or more computers;
a non-transitory storage device storing instructions configured cause the one or more computers to perform operations comprising:
receiving a plurality of motion features, each of the motion features including a respective time series of motion vectors and a first label or a second label;
determining a respective distance between each pair of the motion features that includes a first motion feature having the first label and a second motion feature having the second label;
clustering the motion features into one or more motion clusters based on the distance and a quality threshold, the quality threshold being determined based at least in part on a smallest distance between a motion feature having the first label and a motion feature having the second label; and
representing each of the one or more motion clusters using a motion pattern for recognizing a gesture on a mobile device, the motion pattern including a time series of calculated motion vectors.

26. The system of claim 25, wherein each motion vector includes at least one of:
a linear acceleration value on each of a plurality of motion axes;
an angular rate value each of a plurality of motion axes;
magnetometer data; or
proximity sensor data.

27. The system of claim 26, wherein receiving the motion features comprises:
receiving a time series of motion sensor readings from a mobile device; and
generating the time series of motion vectors of each motion feature from the motion sensor readings using a high-pass filter.

28. The system of claim 25, wherein determining the respective distance includes determining a distance between a time series of motion vectors in a first motion example in the pair and a time series of motion vectors in a second motion example in the pair using dynamic time warping.

29. The system of claim 25, wherein the first label is a positive label indicating that the motion feature is associated with a given gesture, and the second label is a negative label indicating that the motion feature is not associated with the given gesture.

30. The system of claim 29, wherein determining the quality threshold is based at least in part on
a positive multiplier.

31. The system of claim 29, the operations comprising:
identifying an outlier from the motion patterns based on a number of motion features clustered in each of the motion clusters and the labels associated with the motion features; and
excluding the outlier from gesture recognition operations.

32. The system of claim 31, wherein identifying the outlier comprises:
identifying an outlier cluster from the one or more motion clusters, wherein:
the outlier cluster is associated with the first label;
a number of the motion features contained in the outlier cluster is less than an outlier threshold; and
a motion pattern representing a cluster that is closest to the outlier cluster is associated with the second label; and
designating the motion pattern representing the outlier cluster as the outlier.

33. The system of claim 25, wherein clustering the motion features into one or more motion clusters comprises:
identifying a first cluster of motion features, the motion features in the first cluster having a same label, wherein distances between pairs of the motion features in the first cluster satisfy the quality threshold;
removing the first cluster from the motion features; and
repeating the identifying and removing operations until a termination condition is satisfied.

34. The system of claim 25, the operations comprising determining a sphere of influence of each motion pattern based on the motion patterns and the distances between the pairs of the motion features, wherein a motion is designated as matching the motion pattern when a distance between the motion and the motion pattern is within the sphere of influence.

35. The system of claim 34, wherein determining the sphere of influence includes determining the sphere of influence based at least in part on one of a classification radius or a density radius, wherein:
the classification radius is determined based on a distance from the motion pattern within which a threshold portion of motion features have a same label, and
the density radius is determined based on a distance from the motion pattern within which a variance of distances between motion features and the motion pattern satisfies a specified variance threshold.

36. The system of claim 25, the operations comprising:
sending the motion pattern to a mobile device for recognizing a gesture of the mobile device.

* * * * *

UNITED STATES PATENT AND TRADEMARK OFFICE
CERTIFICATE OF CORRECTION

PATENT NO. : 9,110,510 B2  
APPLICATION NO. : 13/153374  
DATED : August 18, 2015  
INVENTOR(S) : Moore et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1110 days.

Signed and Sealed this
Twelfth Day of April, 2016

Michelle K. Lee
*Director of the United States Patent and Trademark Office*